US010263456B1

(12) United States Patent
Wang et al.

(10) Patent No.: US 10,263,456 B1
(45) Date of Patent: Apr. 16, 2019

(54) INTEGRATED THREE-PORT BIDIRECTIONAL DC-DC CONVERTER FOR RENEWABLE ENERGY SOURCES

(71) Applicant: The Florida State University Research Foundation, Inc., Tallahassee, FL (US)

(72) Inventors: Zhan Wang, Knightdale, NC (US); Hui Li, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 378 days.

(21) Appl. No.: 15/069,449

(22) Filed: Mar. 14, 2016

Related U.S. Application Data

(60) Provisional application No. 62/132,857, filed on Mar. 13, 2015.

(51) Int. Cl.
*H02J 9/06* (2006.01)
*H02M 3/24* (2006.01)
*H02J 7/00* (2006.01)

(52) U.S. Cl.
CPC .............. *H02J 9/06* (2013.01); *H02J 7/0068* (2013.01); *H02M 3/24* (2013.01)

(58) Field of Classification Search
CPC .............. H02J 9/06; H02J 7/0068; H02M 3/24
USPC .......................................................... 307/66
See application file for complete search history.

(56) References Cited

U.S. PATENT DOCUMENTS

| | | | |
|---|---|---|---|
| 9,667,157 B1* | 5/2017 | Dong | G01R 19/175 |
| 2011/0249472 A1* | 10/2011 | Jain | H02M 3/33584 363/15 |
| 2014/0063874 A1* | 3/2014 | Liu | H02M 1/14 363/40 |
| 2015/0085531 A1* | 3/2015 | Benchaib | H02M 3/337 363/17 |
| 2016/0099646 A1* | 4/2016 | Safaee | H02M 3/33507 363/17 |
| 2017/0229972 A1* | 8/2017 | Cerqueira Pinto Bezerra Varajao | G01R 25/005 |

OTHER PUBLICATIONS

Divan et al., Design methodologies for soft switched inverters. Conference Record of the 1988 IEEE Industry Applications Society Annual Meeting. 1988. vol. 1: 758-766.

Erickson and Maksimovic. Fundamentals of Power Electronics. Second Edition. Secaucus, NJ, USA: Kluwer Academic Publishers. 2000. ProQuest ebrary. Web. May 18, 2016. Chapter 15: 1-22.

(Continued)

*Primary Examiner* — Thienvu V Tran
*Assistant Examiner* — Brian K Baxter
(74) *Attorney, Agent, or Firm* — Molly L. Sauter; Smith & Hopen, P.A.

(57) ABSTRACT

A three-port bidirectional DC-DC converter for grid-interactive renewable energy source system applications. The three-phase topology is suitable for residential power requirements. The control of the backup battery system and the renewable energy source system are naturally decoupled. In addition, the port interface with the renewable energy is current type, which can implement maximum power point tracking (MPPT) and soft switching under wide variations in the renewable energy source terminal voltage.

17 Claims, 9 Drawing Sheets

(56) References Cited

OTHER PUBLICATIONS

Nilsson and Sannino. Efficiency analysis of low- and medium-voltage DC distribution systems. IEEE Power Engineering Society General Meeting. 2004. vol. 2: 2315-2321.

Kramer et al., Advanced power electronic interfaces for distributed energy systems, Part 1: Systems and Topologies. National Renewable Energy Laboratory. Golden, Colorado. 2008. Technical Report: NREL/TP-581-42672.

Kurohane et al., Control strategy for a distributed dc power system with renewable energy. Renewable Energy. 2011. vol. 36: 42-49.

Byeon et al., A research on the characteristics of fault current of DC distribution system and AC distribution system. 2011 IEEE 8th International Conference on Power Electronics and ECCE Asia (ICPE & ECCE). 2011: 543-550.

Brenna et al., Proposal of a local DC distribution network with distributed energy resources. 11th International Conference on Harmonics and Quality of Power. 2004: 397-402.

Kai et al., A Distributed Control Strategy Based on DC Bus Signaling for Modular Photovoltaic Generation Systems With Battery Energy Storage. IEEE Transactions on Power Electronics. 2011. vol. 26 (No. 10): 3032-3045.

Seo et al., Modeling and analysis of DC distribution systems. 2011 IEEE 8th International Conference on Power Electronics and ECCE Asia (ICPE & ECCE). 2011: 223-227.

Lu et al, Application of Petri nets for the energy management of a photovoltaic based power station including storage units. Renewable Energy. 2010. vol. 35: 1117-1124.

Riffonneau et al., Optimal Power Flow Management for Grid Connected PV Systems With Batteries. IEEE Transactions on Sustainable Energy. 2011. vol. 2 (No. 3): 309-320.

Denholm and Margolis. Evaluating the limits of solar photovoltaics (PV) in electric power systems utilizing energy storage and other enabling technologies. Energy Policy. 2007. vol. 35: 4424-4433.

Qian et al., Modeling and Control of Three-Port DC/DC Converter Interface for Satellite Applications. IEEE Transactions on Power Electronics. 2010. vol. 25 (No. 3): 637-649.

Tao et al., Transformer-Coupled Multiport ZVS Bidirectional DC-DC Converter With Wide Input Range. IEEE Transactions on Power Electronics. 2008. vol. 23 (No. 2): 771-781.

Krishnaswami and Mohan. Three-Port Series-Resonant DC-DC Converter to Interface Renewable Energy Sources With Bidirectional Load and Energy Storage Ports. IEEE Transactions on Power Electronics. 2009. vol. 24 (No. 10): 2289-2297.

Wang et al., Asymmetrical Duty Cycle Control and Decoupled Power Flow Design of a Three-port Bidirectional DC-DC Converter for Fuel Cell Vehicle Application. IEEE Transactions on Power Electronics. 2012. vol. 27 (No. 2): 891-904.

Wang and Li. A Soft Switching Three-phase Current-fed Bidirectional DC-DC Converter With High Efficiency Over a Wide Input Voltage Range. IEEE Transactions on Power Electronics. 2012. vol. 27 (No. 2): 669-684.

Global Warming. Wikipedia. Date Accessed Apr. 28, 2016. https://en.wikipedia.org/wiki/Global_warming.

Greenhouse gas emissions by the United States. Wikipedia. Date Accessed Apr. 28, 2016. https://en.wikipedia.org/wiki/Greenhouse_gas_emissions_by_the_United_States.

Zhao et al., Full-order averaging modelling of zero-voltage-switching phase-shift bidirectional DC-DC converters. IET Power Electronics. 2010. vol. 3 (No. 3): 400-410.

Su et al., A Reduced-Part, Triple-Voltage DC-DC Converter for EV/HEV Power Management. IEEE Transaction on Power Electronics. 2009. vol. 24 (No. 10): 2406-2410.

Ashtiani et al., Ultracapacitors for automotive applications. Journal of Power Sources. 2006. vol. 154: 561-566.

Miller et al., Ultracapacitor Plus Battery Energy Storage System Sizing Methodology for HEV Power Split Electronic CVT's. Proceedings of the IEEE International Symposium on Industrial Electronics (ISIE). Dubrovnik, Croatia. 2005: 317-324.

Tanaka et al., A new half-bridge based inverter with the reduced-capacity DC capacitors for DC micro-grid. IEEE Energy Conversion Congress and Exposition. 2010: 2564-2569.

Kakigano et al., Distribution voltage control for DC microgrid by converters of energy storages considering the stored energy. IEEE Energy Conversion Congress and Exposition. 2010: 2851-2856.

Ito et al., DC microgrid based distribution power generation system. The 4th International Power Electronics and Motion Control Conference (IPEMC 2004). 2004. vol. 3: 1740-1745.

De Doncker et al., A three-phase soft-switched high-power-density DC/DC converter for high-power applications. IEEE Transaction on Industry Applications. 1991. vol. 27 (No. 1): 63-73.

Wang et al., Design, implementation, and experimental results of bi-directional full-bridge DC/DC converter with unified soft-switching scheme and soft-starting capability. IEEE 31st Annual Power Electronics Specialists Conference (PESC 00). 2000. vol. 2: 1058-1063.

Zhu. A novel soft-commutating isolated boost full-bridge ZVS-PWM DC-DC converter for bidirectional high power applications. IEEE 35th Annual Power Electronics Specialists Conference (PESC 04). 2004. vol. 3: 2141-2146.

Peng et al., A new ZVS bidirectional DC-DC converter for fuel cell and battery application. IEEE Transactions on Power Electronics. 2004. vol. 19 (No. 1): 54-65.

Lixin and Su. An Interleaved Reduced-Component-Count Multivoltage Bus DC/DC Converter for Fuel Cell Powered Electric Vehicle Applications. IEEE Transactions of Industry Applications. 2008. vol. 44 (No. 5): 1638-1644.

Li and Liu. Power Distribution Strategy of Fuel Cell Vehicle System with Hybrid Energy Storage Elements Using Triple Half Bridge (THB) Bidirectional DC-DC converter. 42nd IAS Annual Meeting. Industry Applications Conference. 2007: 636-642.

Di Napoli et al., Multiple input DC-DC power converter for fuel-cell powered hybrid vehicles. IEEE 33rd Annual Power Electronics Specialists Conference (PSEC 2002). 2002. vol. 4: 1685-1690.

Solera et al., Design of multiple-input power converter for hybrid vehicles. IEEE Transactions on Power Electronics. 2005. vol. 20 (No. 5): 1007-1016.

Liu et al., Power balance control and voltage conditioning for fuel cell converter with multiple sources. IEEE 33rd Annual Power Electronics Specialists Conference. 2002. vol. 4: 2001-2006.

Kotsopoulos et al., A converter to interface ultra-capacitor energy storage to a fuel cell system. IEEE International Symposium on Industrial Electronics. 2004. vol. 2L 827-832.

Wang and Li. Optimized operating mode of current-fed dual half bridges dc-dc converters for energy storage applications. IEEE Energy Conversion Congress and Exposition. 2009: 731-737.

Huang et al., Parasitic ringing and design issues of digitally controlled high power interleaved boost converters. IEEE Transactions on Power Electronics. 2004. vol. 19 (No. 5): 1341-1352.

Kheraluwala et al., Performance characterization of a high-power dual active bridge DC-to-DC converter. IEEE Transactions on Industry Applications. 1992. vol. 28 (No. 6): 1294-1301.

Vangen et al., Efficient high-frequency soft-switched power converter with signal processor control. 13th International Telecommunications Energy Conference (INTELEC '91). 1991: 631-639.

Vangen et al., Soft-switched high-frequency, high power DC/AC converter with IGBT. 23rd Annual IEEE Power Electronics Specialists Conference (PESC '92): 1992. vol. 1: 26-33.

Vangen et al., Dual active bridge converter with large soft-switching range. Fifth European Conference on Power Electronics and applications. 1993. vol. 3: 328-333.

Fan et al., High frequency high efficiency bidirectional dc-dc converter module design for 10 kVA solid state transformer. 25th Annual IEEE Applied Power Electronics Conference and Exposition (APEC). 2010: 210-215.

Li et al., A natural ZVS medium-power bidirectional DC-DC converter with minimum number of devices. IEEE Transaction on Industry Applications. 2003. vol. 39 (No. 2): 525-535.

Su et al., A Three-Phase Bidirectional DC-DC Converter for Automotive Applications. IEEE Industry Applications Society Annual Meeting (IAS '08). 2008: 1-7.

(56) References Cited

OTHER PUBLICATIONS

Liu et al., Modeling and control of a novel six-leg three-phase high-power converter for low voltage fuel cell applications. IEEE 35th Annual Power Electronics Specialists Conference (PESC 04). 2004: 4715-4721.

Marchesoni and Vacca. New DC-DC Converter for Energy Storage System Interfacing in Fuel Cell Hybrid Electric Vehicles. IEEE Transaction on Power Electronics. 2007. vol. 22 (No. 1): 301-308.

Al-Atrash et al., Tri-Modal Half-Bridge Converter for Three-Port Interface. IEEE Transactions on Power Electronics. 2007. vol. 22 (No. 1): 341-345.

Wang and Li. Unified modulation for three-phase current-fed bidirectional dc-dc converter under varied input voltage. 2010 25th Annual IEEE Applied Power Electronics Conference and Exposition (APEC). 2010: 807-812.

Jang et al., Bi-directional dc-dc converter for fuel cell generation system. 2004 IEEE 35th Power Specialists Conference (PESC 04). 2004. 4722-4728.

Wang et al., Bi-directional DC to DC converters for fuel cell systems. Power Electronics in Transportation. 1998: 47-51.

Krismer and Kolar. Accurate Power Loss Model Derivation of a High-Current Dual Active Bridge Converter for an Automotive Application. IEEE Transaction on Industrial Electronics. 2010. vol. 57 (No. 3): 881-891.

Inoue et al., A Bidirectional DC-DC Converter for an Energy Storage System With Galvanic Isolation. IEEE Transactions on Power Electronics. 2007. vol. 22 (No. 6): 2299-2306.

Tan et al., Voltage Balancing of a 320-V, 12-F Electric Double-Layer Capacitor Bank Combined With a 10-kW Bidirectional Isolated DC-DC Converter. IEEE Transaction on Power Electronics. vol. 23 (No. 6): 2755-2765.

Gitau et al., Power processor for interfacing battery storage system to 725 V DC bus. Energy Conversion and Management. 2007. vol. 48: 871-881.

Wang et al., Theory and application of distribution electronic power transformer. Electric Power Systems Research. 2007. vol. 77: 219-226.

Qin and Kimball. Ac-ac dual active bridge converter for solid state transformer. 2009 IEEE Energy Conversion Congress and Exposition (ECCE 2009). 2009: 2329-3721.

Xie et al., Power Flow Characterization of a Bidirectional Galvanically Isolated High-Power DC/DC Converter Over a Wide Operating Range. IEEE Transactions on Power Electronics. 2010. vol. 25 (No. 1): 54-66.

Tao et al., Three-Port Triple-Half-Bridge Bidirectional Converter With Zero-Voltage Switching. IEEE Transaction on Power Electronics. 2008. vol. 23 (No. 2): 782-792.

Bai et al., Eliminate Reactive Power and Increase System Efficiency of Isolated Bidirectional Dual-Active-Bridge DC-DC Converters Using Novel Dual-Phase-Shift Control. IEEE Transactions on Power Electronics. 2008. vol. 23 (No. 6): 2905-2914.

Zhou et al., Hybrid Modulation for Dual-Active-Bridge Bidirectional Converter With Extended Power Range for Ultracapacitor Application. IEEE Transactions on Industry Applications. 2009. vol. 45 (No. 4): 1434-1442.

Zhu. A novel soft-commutating isolated boost full-bridge ZVS-PWM DC-DC converter for bidirectional high power applications. 2004 IEEE 35th Annual Power Electronics Specialists Conference (PESC 04). 2004. vol. 3: 2141-2146.

Su and Tang. A Multiphase, Modular, Bidirectional, Triple-Voltage DC-DC Converter for Hybrid and Fuel Cell Vehicle Power Systems. IEEE Transaction on Power Electronics. 2008. vol. 23 (No. 6): 3035-3046.

Gerber et al., Interleaving optimization in synchronous rectified DC/DC converters. 2004 IEEE 35th Annual Power Electronics Specialists Conference (PESC 04). 2004. vol. 6: 4655-4661.

Wang and Li. Three-phase bidirectional DC-DC converter with enhanced current sharing capability. 2010 IEEE Energy Conversion Congress and Exposition. 2010: 1116-1122.

Zhao et al., An Isolated Three-Port Bidirectional DC-DC Converter With Decoupled Power Flow Management. IEEE Transactions on Power Electronics. 2008. vol. 23 (No. 5): 2443-2453.

Ferrell et al., The role of parasitic inductance in high-power planar transformer design and converter integration. 19th Annual IEEE Applied Power Electronics Conference and Exposition (APEC 04). 2004. vol. 1: 510-515.

\* cited by examiner

INTEGRATED THREE-PORT BIDIRECTIONAL DC-DC CONVERTER FOR RENEWABLE ENERGY SOURCES

CROSS-REFERENCE TO RELATED APPLICATIONS

This application claims priority to currently U.S. Provisional Patent Application No. 62/132,857, entitled "Integrated Three-Port Bidirectional DC-DC Converter For Renewable Energy Sources Application", having a filing date of Mar. 13, 2015, the entirety of which is hereby incorporated by reference.

GOVERNMENT SUPPORT

This work is supported by the National Science Foundation (NSF) under the Electrical, Communications and Cyber Systems Division (ECCS) through ECCS-0641972. The Government has certain rights in the invention.

FIELD OF INVENTION

This invention relates to renewable energy sources systems, and more particularly, to a renewable energy source (RES) system having a battery backup.

BACKGROUND OF THE INVENTION

The use of renewable energy source (RES) systems, such as photovoltaic (PV) systems, rectified wind turbine systems, fuel cell systems and ultracapacitor systems, which incorporate battery backup systems, is expected to increase as the Feed-in Tariff (FiT) rates are set to decline and conventional electricity prices are projected to rise. Additionally, the use of renewable energy sources with battery backup systems is expected to increase as a result of the ability of the integrated systems to mitigate the high penetration issue into the grid.

With Feed-in Tariff rates decreasing, users are moving away from buying renewable energy systems as an investment in order to capitalize on attractive government incentives, and are instead moving toward buying systems that will save energy and money, by generating their own electricity and reducing their reliance on electricity provided by utility companies. Adding a battery backup system to the renewable energy system is seen as an effective way of retaining the less expensive renewable energy electricity that users are generating, allowing them to use their renewable energy generated electricity later in the day to avoid paying high prices for the utility electricity, especially during peak demand time.

As currently known in the art, renewable energy system converters and battery backup converters are manufactured as separate power converters, and as such, the complexity of power management and system cost is increased due to the requirement of the additional battery backup converter.

As shown in FIG. 1, in a conventional system, the utility grid 105 interfaces with a DC bus 115 through a DC/AC converter 140. In addition the system may include, a local system 100 incorporating a battery back system (Energy Storage System, ESS) 125 coupled to the DC bus 115 through a DC-DC converter 130, a renewable energy system 135 coupled to the DC bus 115 through a AC, DC-DC converter 120 and a DC Load 110 coupled to the DC Bus 115. In the conventional system, the battery backup system 125 and the renewable energy system 135 are coupled to the DC bus 115 by two independent power converters, one power converter 130 for the battery backup system 125 and a separate power converter 120 for the renewable energy system 135. However, implementing two independent power converters 120, 130 requires the use of a complex power management system for switching between the battery backup system 125 and the renewable energy system 135 and for the required charging and discharging of the batteries.

Multi-port DC-DC converters are known in the art as an attractive solution that is suitable for integrating the renewable energy system and the battery backup system, providing the advantages of high efficiency, high power density and cost-effectiveness. In particular, magnetic coupled three-port DC-DC converters have been proposed to interface with the renewable energy system and the battery backup system. However, DC-DC converters known in the art are not capable of charging batteries from a common DC bus side, due to the unidirectional power flow between the primary and secondary side of the high frequency transformers of the DC-DC converter. Moreover, it is desirable to decouple the power control of the renewable energy system and the battery back-up system so that a decoupled controller can be designed. Additionally, the systems known in the prior art also result in an undesirable circulating current between the three ports of the DC-DC converter, which results in a decrease in the system efficiency.

Accordingly, what is needed in the art is a distributed renewable energy system having an integrated battery backup system and an intelligent energy management system that can control the power flow among the energy sources, batteries, load and utility grid in order to achieve the most economical and efficient electric supply.

SUMMARY OF INVENTION

In accordance with the present invention is described, an integrated three-port bidirectional DC-DC converter that interfaces with renewable resource systems and battery systems. The three-port DC-DC converter of the present invention mainly consists of a dual active bridge (DAB) converter, which can be a dual half-bridge, dual full-bridge or dual three-phase converter for different power rating application. With no additional components added, the cost and complexity of the system does not increase.

In one embodiment, the present invention provides an integrated three-port bidirectional DC-DC converter comprising, a dual active bridge (DAB) converter having a phase-shift angle control, a bidirectional DC bus port coupled to a high voltage side of the DAB converter, a bidirectional DC-link port coupled to a low voltage side of the DAB converter, a bidirectional current source port coupled to the low voltage side of the DAB converter and a boost converter having a duty cycle control coupled between the bidirectional DC-link port and the bidirectional current source port. The invention further includes a power flow controller for controlling the phase-shift angle of the DAB converter and the duty cycle of the boost converter.

In an additional embodiment, a DC distributed system in accordance with the present invention may include, a battery backup system coupled to the bidirectional DC-link port of DAB converter and a renewable energy source system coupled to the bidirectional current source port of DAB converter.

In various embodiment of the present invention, the renewable energy source system may be a photovoltaic system, a rectified wind turbine system, a fuel cell system or an ultracapacitor system.

In another embodiment, the present invention provides a method of providing DC distributed energy which includes, coupling a battery backup system to a low voltage side bidirectional DC-link port of an integrated three-port bidirectional DC-DC converter, wherein the DC-link port includes a boost converter having duty cycle control, coupling a renewable energy source system coupled to a low voltage side bidirectional current source port of the integrated three-port bidirectional DC-DC converter, wherein the current source port includes a dual active bridge (DAB) converter having a phase-shift angle control, coupling a DC distributed bus to a high voltage side bidirectional port of the high voltage side of the integrated three-port bidirectional DC-DC converter and controlling the battery backup system, the renewable energy source system and the DC distributed bus to provide DC distributed energy.

As such, the present invention provides a distributed renewable energy system having an integrated battery backup system and an intelligent energy management system that can control the power flow among the energy sources, batteries, load and utility grid in order to achieve the most economical and efficient DC distributed energy system.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

A three-port bidirectional DC-DC converter is proposed for grid-interactive renewable energy source system applications. The three-phase topology is suitable for residential power requirements. The control of the backup battery system and the renewable energy source system are naturally decoupled. In addition, the port interface with the renewable energy is current type, which can implement maximum power point tracking (MPPT) and soft switching under wide variations in the renewable energy source terminal voltage.

Figure 1:
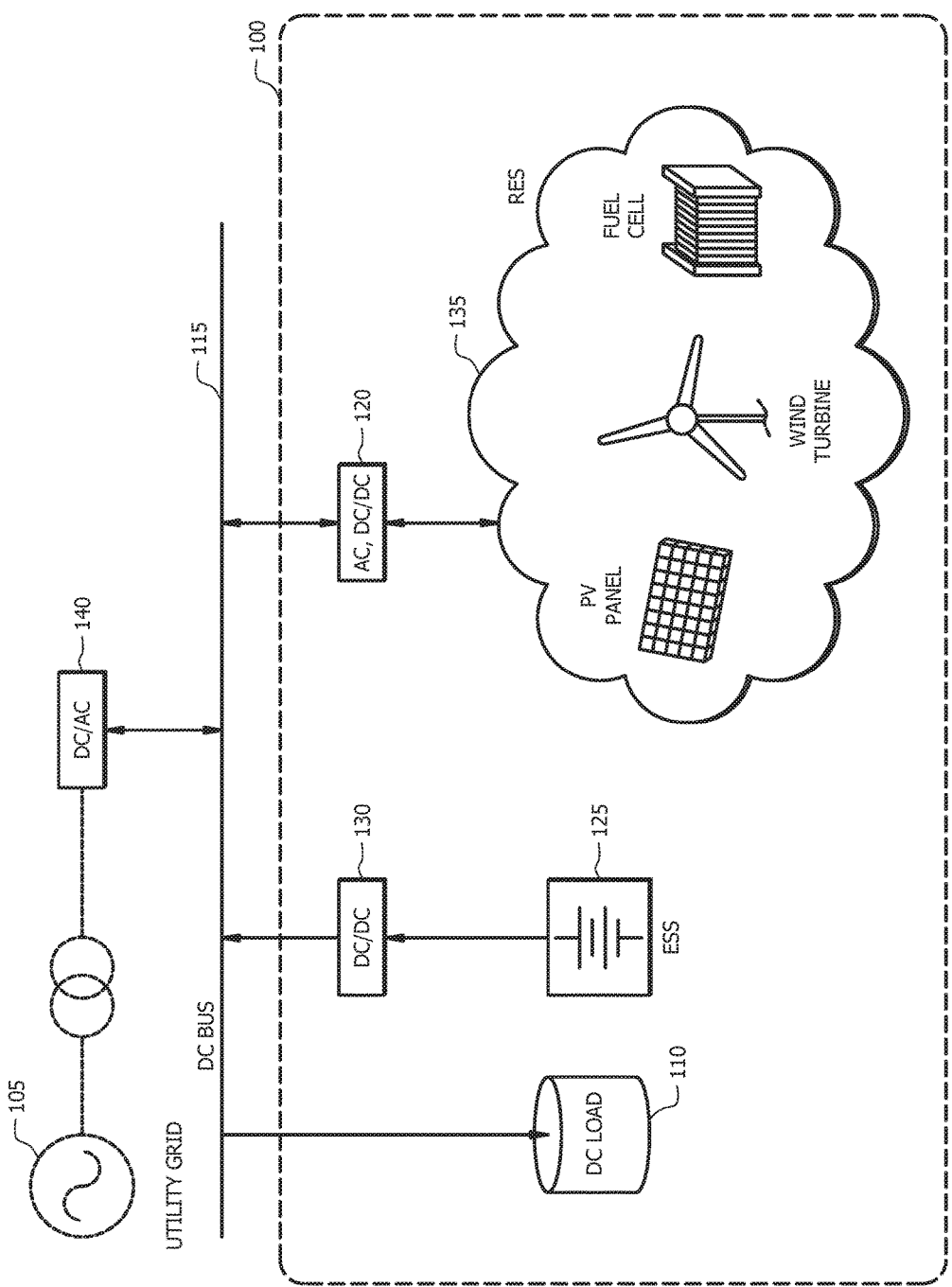
FIG. 1 illustrates a combined renewable energy source (RES) and battery backup system in accordance with the prior art.
Figure 2:
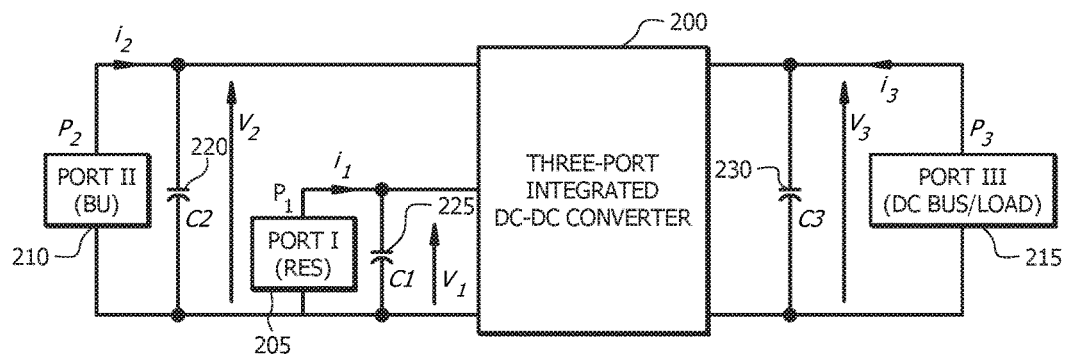
FIG. 2 is a circuit diagram of a system incorporating a three-port integrated bidirectional DC-DC converter in accordance with an embodiment of the present invention.

The three-port topology in accordance with an embodiment of the present invention is shown with reference to FIG. 2. As illustrated in FIG. 2, one port of the low voltage side of the proposed three-port integrated bidirectional DC-DC converter 200 is designed as a current source port that the renewable energy source (RES) 205 is connected to in order to meet the maximum power point tracking (MPPT) and voltage variation requirement. The battery backup system 210 is connected to the low voltage side (LVS) DC-link port, due to the small voltage variation of the battery back up system 210. The DC distributed bus 215 is connected to the high voltage side (HVS) port of the three-port integrated bidirectional DC-DC converter 200 to realize galvanic isolation by a high frequency transformer. As shown in FIG. 2, a current-fed dual active bridge (DAB) converter is applied to realize the bidirectional power flow function and a high frequency transformer of the DAB converter can provide galvanic isolation and voltage-level matching between low voltage energy sources and high voltage DC bus. In this embodiment, first capacitive element 225 is coupled across the current source port of the three-port integrated DC-DC converter 200, a second capacitive element 220 is coupled across the DC-link port of the three-port integrated DC-DC converter 200 and a third capacitive element 230 is coupled across the DC bus port of the three-port integrated DC-DC converter 200.

Figure 3A:
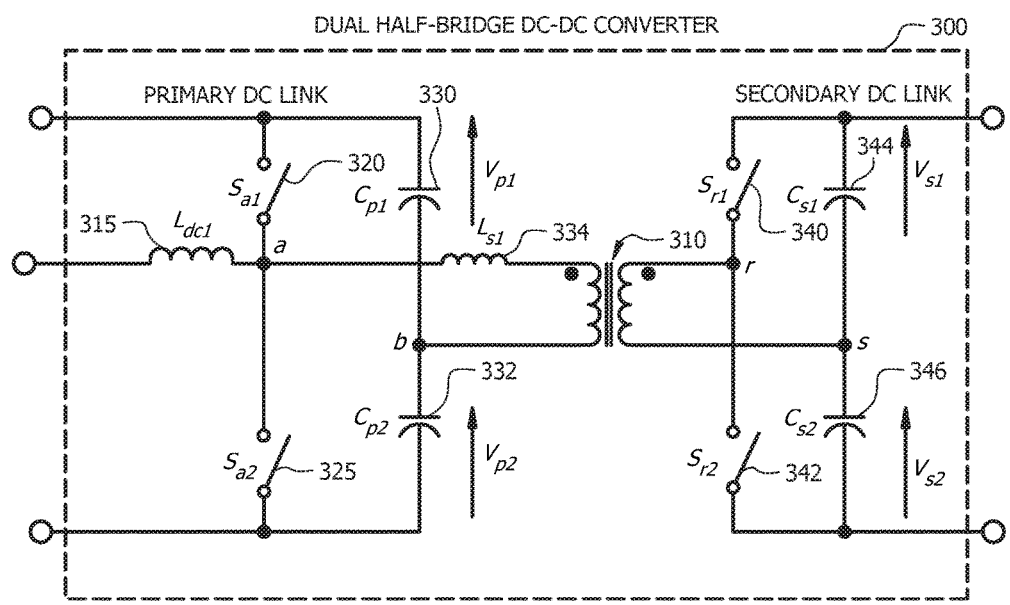
FIG. 3A illustrates an integrated three-port DC-DC converter, wherein the three-port DC-DC converter is a dual half-bridge DC-DC converter, in accordance with an embodiment of the present invention.

FIG. 3A illustrates an embodiment of the three-port integrated DC-DC converter of the present invention wherein the converter is a dual half-bridge DC-DC converter 300. As shown, the dual half-bridge DC-DC converter 300 includes a primary DC link and a secondary DC link separated by a high frequency transformer 310. The DC bus is connected to the DC bus port on the high voltage side of the dual half-bridge DC-DC converter 300 through a network of switches 340, 342 such that the voltage on the high voltage side is incident across two capacitors 344, 346. The leakage inductance 334 of the high frequency transformer is an energy storage element to transfer the power between the two sides and the power flow is mainly controlled by a phase-shift angle φ. The middle point of the half-bridge leg on the low voltage side of the three-port integrated DC-DC converter 300 is connected to one energy source port through DC inductors $L_{dc}$ 315 and the duty cycle D is an additional control variable to adjust the power distribution between the two ports on the low voltage side of the DC-DC converter 300. In the application of a renewable energy source (RES) system on the DC distribution bus, the converter 300 is applied to interface with the RES system, the battery unit (BU) and DC bus or load. The BU is connected to the LVS DC-link port and the RES system is coupled to the current source port by the switching network 320, 325 as directed by the power flow control, wherein the power from the battery backup unit flows across a first capacitive element 330 and the power from the RES system flows across a second capacitive element 332. The voltage of the battery backup system changes slowly with different state of charge (SOC), so the primary side DC-link voltage can be treated as almost constant. The RES system is connected to the current source port. The output voltage and current of the RES system changes in a large range, due to different input power conditions. The DC inductor 315 and primary side switches 320, 325 are used to boost the RES voltage and maximum power point tracking (MPPT) can be realized by the duty cycle control. With the help of DC inductors 315, zero voltage switching (ZVS) is guaranteed in all operating modes, even though the voltage of the backup battery system changes with different SOC.

Figure 3B:
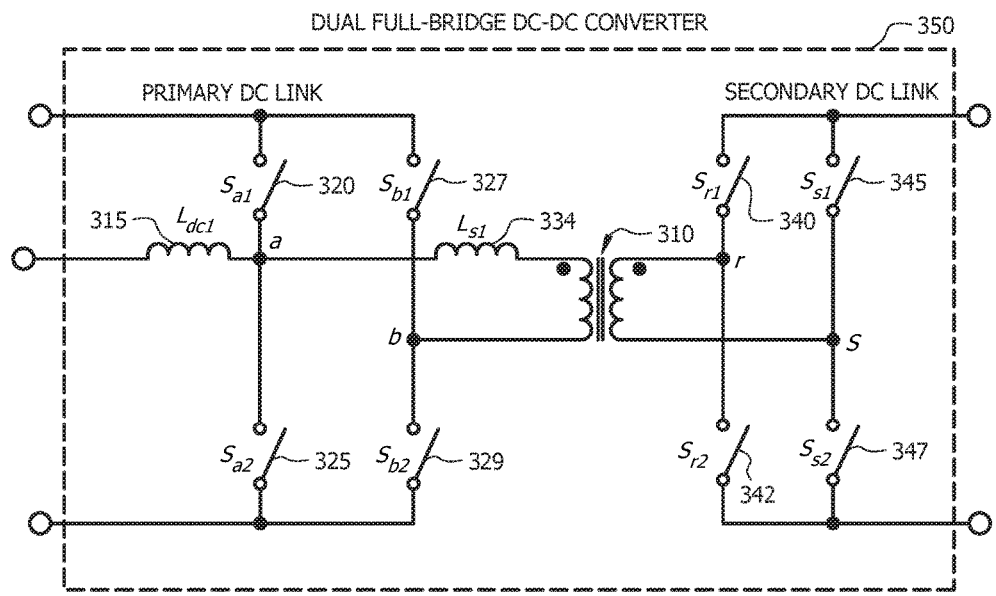
FIG. 3B illustrates an integrated three-port DC-DC converter, wherein the three-port DC-DC converter is a dual full-bridge DC-DC converter, in accordance with an embodiment of the present invention.

FIG. 3B illustrates an embodiment of the three-port integrated DC-DC converter of the present invention wherein the converter is a dual full-bridge DC-DC converter 350. As shown, the dual full-bridge DC-DC converter 350 includes a primary DC link and a secondary DC link separated by a high frequency transformer 310. The DC bus is connected to the DC bus port on the high voltage side of the dual full-bridge DC-DC converter 350 through a network of switches 340, 342, 345, 347. The leakage inductance 334 of the high frequency transformer 310 is an energy storage element to transfer the power between the two sides and the power flow is mainly controlled by a phase-shift angle φ. The middle point of the half-bridge leg on the low voltage side of the dual full-bridge DC-DC converter 350 is connected to one energy source port through DC inductors $L_{dc}$ 315 and the duty cycle D is an additional control variable to adjust the power distribution between the two ports on the low voltage side of the dual full-bridge DC-DC converter 350. In the application of a renewable energy source (RES) system on the DC distribution bus, the converter 350 is applied to interface with the RES system, the battery unit (BU) and DC bus or load. The BU is connected to the low voltage side (LVS) DC-link port and the RES system is coupled to the current source port by the switching network 320, 325, 327, 329 as directed by the power flow control. The voltage of the battery backup system changes slowly with different state of charge (SOC), so the primary side DC-link voltage can be treated as almost constant. The RES system is connected to the current source port. The output voltage and current of the RES system changes in a large range, due to different input power conditions. The DC inductor 315 and primary side switches 320, 325, 327, 329 are used to boost the RES voltage and maximum power point tracking (MPPT) can be realized by the duty cycle control. With the help of DC inductors 315, zero voltage switching (ZVS) is guaranteed in all operating modes, even though the voltage of the backup battery system changes with different SOC.

Figure 3C:
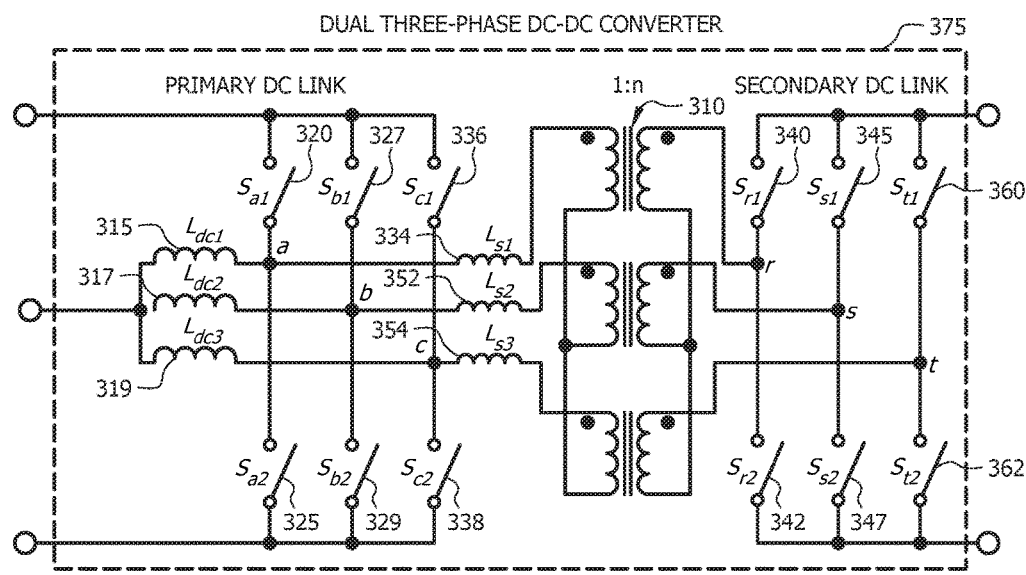
FIG. 3C illustrates an integrated three-port DC-DC converter, wherein the three-port DC-DC converter is a dual three-phase DC-DC converter, in accordance with an embodiment of the present invention.

FIG. 3C illustrates an embodiment of the three-port integrated DC-DC converter of the present invention wherein the converter is a dual three-phase DC-DC converter 375. As shown, the dual three-phase DC-DC converter 375 includes a primary DC link and a secondary DC link separated by a high frequency transformer 310, comprising three windings. The DC bus is connected to the DC bus port on the high voltage side of the dual three-phase DC-DC converter 375 through a network of switches 340, 342, 345, 347, 360, 362. The leakage inductance 334, 352, 354 of the high frequency transformer 310 is an energy storage element to transfer the power between the two sides and the power flow is mainly controlled by a phase-shift angle φ. The middle point of the half-bridge leg on the low voltage side of the dual three-phase DC-DC converter 375 is connected to one energy source port through DC inductors $L_{dc1}, L_{dc2}, L_{dc3}$ 315, 317, 319 and the duty cycle D is an additional control variable to adjust the power distribution between the two ports on the low voltage side of the DC-DC converter 375. In the application of a renewable energy source (RES) system on the DC distribution bus, the converter 375 is applied to interface with the RES system, the battery unit (BU) and DC bus or load. The BU is connected to the low voltage side (LVS) DC-link port and the RES system is coupled to the current source port by the switching network 320, 325, 327, 329, 336, 338 as directed by the power flow control. The voltage of the battery backup system changes slowly with different state of charge (SOC), so the primary side DC-link voltage can be treated as almost constant. The RES system is connected to the current source port. The output voltage and current of the RES system changes in a large range, due to different input power conditions. The DC inductor 315, 317, 319 and primary side switches 320, 325, 327, 329, 336, 338 are used to boost the RES voltage and maximum power point tracking (MPPT) can be realized by the duty cycle control. With the help of DC inductors 315, 317, 319, zero voltage switching (ZVS) is guaranteed in all operating modes, even though the voltage of the backup battery system changes with different SOC.

Figure 4:
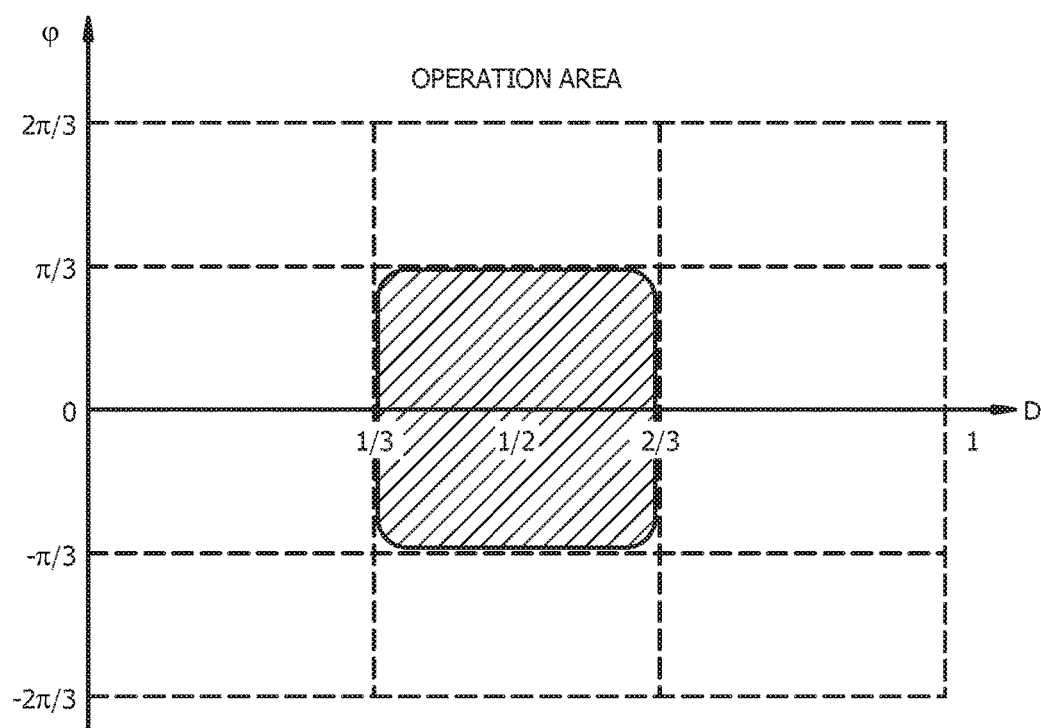
FIG. 4 illustrates the operating area of a converter with different (φ, D), in accordance with an embodiment of the present invention.

The modulation strategy of the three-port integrated DC-DC converter of the present invention is phase-shift plus duty cycle, so the converter operation range is a two dimension area of (φ, D), as shown in FIG. 4. The power flow between the low voltage side (LVS) and the high voltage side (HVS) will change according to different combinations of duty cycle and phase-shift angle. In the real applications, in order to operate the converter to achieve a high efficiency, the duty cycle is limited between 1/3 and 2/3, and the phase-shift angle should be smaller than π/3 for low reactive power loss. The power flow equation of port 3 is a function of phase-shift angle φ and duty cycle D:

$$P_3 = f(\varphi, D) \quad (1)$$

There are five operation modes for the three-port integrated DC-DC converter, due to extra power flow combinations, which are listed in Table 1. Due to the power conservation law, the power satisfies:

$$P_1 + P_2 - P_3 = 0 \quad (2)$$

TABLE I

Operation modes in terms of different power flow

|  |  | $P_{RES} > 0$ | $P_{RES} = 0$ |
|---|---|---|---|
| $P_{BUS} < 0$ | $P_{Bat} < 0$ | Mode A | Doesn't exist |
|  | $P_{Bat} > 0$ | Mode B | Mode D |
| $P_{BUS} > 0$ | $P_{Bat} < 0$ | Mode C | Mode E |
|  | $P_{Bat} > 0$ | Doesn't exist | Doesn't exist |

In Mode A when $P_1 = -P_2 - P_3 > 0$, the renewable energy power is high and RES can provide power to the DC bus and charge the battery at the same time. In this mode, the battery backup system (BU) functions to store the extra energy. The objective of power control in Mode A can be either the battery's charging current $I_{bat}$ or the scheduled DC bus current $I_{bus}$. If $I_{bus}$ is chosen as the control objective, the relationship of V in terms of $I_{bus}$ can be derived.

In Mode B when $P_1+P_2=-P_3>0$, the renewable energy power is not high enough, so in this mode RES with BU together provide power to meet the scheduled DC bus load requirement and the BU functions as an energy source to support the DC bus load. In this mode only the bus current $I_{bus}$ can be controlled, therefore φ is derived.

In Mode C when $P_1+P_3=-P_2>0$, the SOC of the battery backup system is low, so in this mode, RES and DC bus will provide power to charge the battery. Since a constant charging current is preferred, the DC bus power is used to maintain a constant charging current and to mitigate the disturbance resulting from the RES power.

In Mode D when $P_3=-P_2>0$, there is no RES power under some conditions and the power from DC bus can charge the battery. This mode is used to save the grid energy into the energy storage system when the utility price is low at night or there is excessive power generated from other energy source.

In Mode E when $P_2=-P_3>0$, there is no RES power and the battery can discharge to meet the requirement of DC bus load. This mode mainly happens in the stand-alone mode and there is no other energy source available to support the load. The BU functions as a back-up energy source to provide uninterruptable power.

The insight information between the control objective ($I_{bat}$ or $I_{bus}$) and control variable φ can be derived in Mode A-E, which will help to design the controller in these modes. There are other operations modes in which solar power is only to charge the battery or solar power is only to support the DC bus load, but they are not common and can be avoided with proper power management strategy.

Define $m=L_{dc}/L_s$, the DC inductor current ripple of each phase can be calculated as:

$$\Delta I_{dc} = \frac{2D(1-D)\pi}{m\omega L_s} V_d \quad (3)$$

When RES does not provide power, it becomes a two-port condition. The ZVS conditions of the switches for one phase should satisfy the in equation (4):

$$\begin{cases} Sa1: \frac{1}{2}\Delta I_{dc} - i_{Ls}(t_{Sa1\_on}) > 0 \\ Sa2: \frac{1}{2}\Delta I_{dc} + i_{Ls}(t_{Sa2\_on}) > 0 \\ Sr1: i_{Ls}(t_{Sr1\_on}) > 0 \\ Sr2: i_{Ls}(t_{Sr2\_on}) < 0 \end{cases} \quad (4)$$

When RES generates power, the soft-switching is not only related to DC inductor current but also related to the RES power.

According to different power flow directions, the equations (4) should be satisfied:

$$\begin{cases} Sa1: I_{dc\_avg} + \frac{1}{2}\Delta I_{dc} - i_{Ls}(t_{Sa1\_on}) > 0 \\ Sa2: -I_{dc_{avg}} + \frac{1}{2}\Delta I_{dc} + i_{Ls}(t_{Sa2\_on}) > 0 \\ Sr1: i_{Ls}(t_{Sr1\_on}) > 0 \\ Sr2: i_{Ls}(t_{Sr2\_on}) < 0 \end{cases} \quad (5)$$

From (4) and (5), it can be seen that, the current ripple $\Delta I_{dc}$ can help the switches on the primary side of the converter to achieve soft-switching conditions.

The power between the primary side and secondary side is related to (φ,D), as described in equation (1). Compared to duty cycle D, the phase shift angle φ has a stronger effect on the power flow. Moreover, the power flow of the three-phase converter is only related to the phase-shift angle φ, and does not depend on D. As such, the three-port converter can be treated as a boost converter with duty cycle control connected to a dual active bridge (DAB) converter with phase-shift angle control. Therefore, it becomes a conventional two stage DC-DC converter, wherein the controller includes boost controller and DAB controller with fixed duty cycle.

Figure 5A:
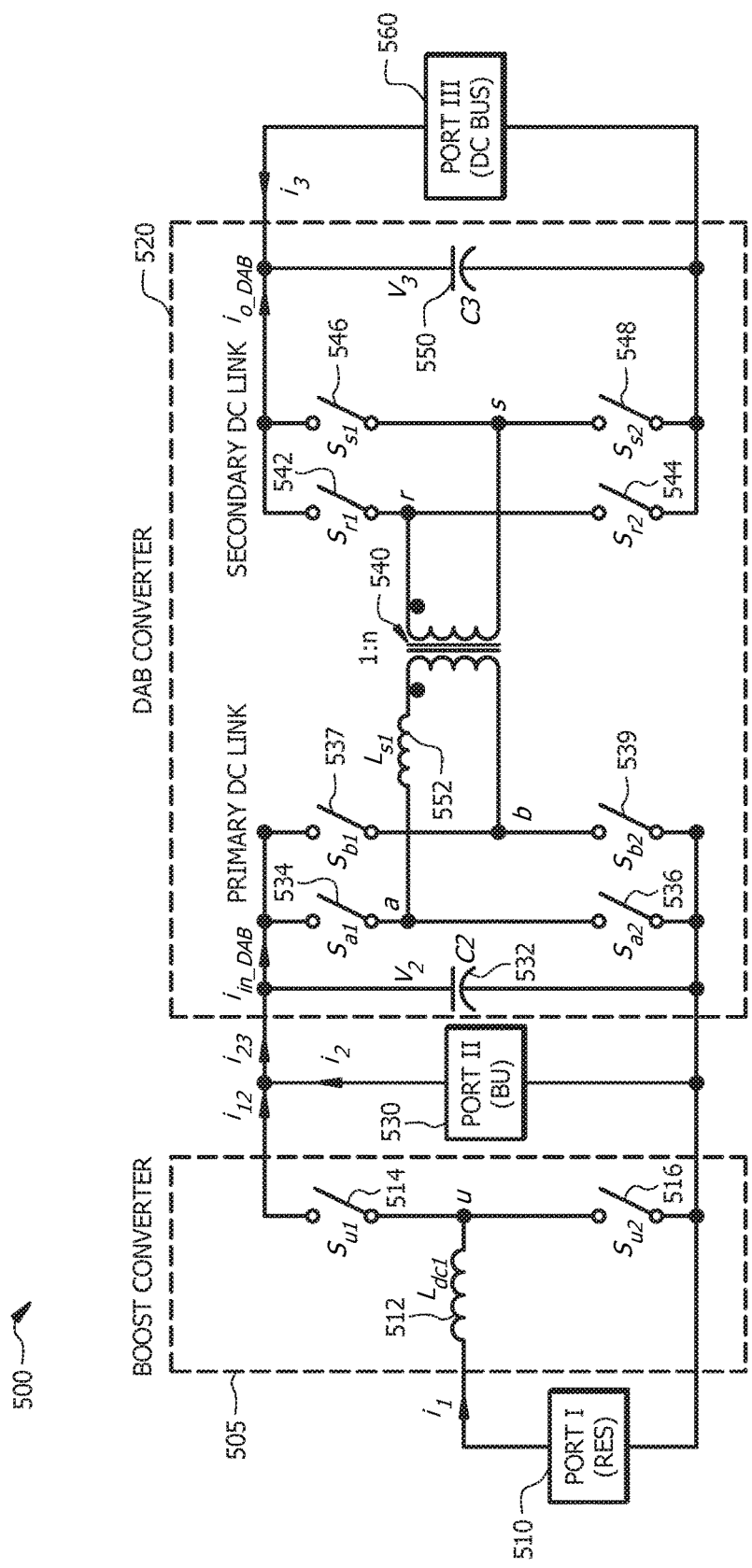
FIG. 5A illustrates an equivalent circuit of a three-port DC-DC converter, wherein the three-port converter is a dual half-bridge converter, in accordance with an embodiment of the present invention.

As shown in FIG. 5A, an integrated three-port bidirectional DC-DC converter 500 in accordance with the present invention includes a dual active bridge (DAB) converter 520 having a phase-shift angle control, a bidirectional DC bus port 560 coupled to a high voltage side of the DAB converter 520, a bidirectional DC-link port 530 coupled to a low voltage side of the DAB converter 520, a bidirectional current source port 510 coupled to the low voltage side of the DAB converter 520 and a boost converter 505 having a duty cycle control, the boost converter 505 coupled between the bidirectional DC-link port 530 and the bidirectional current source port 510. In operation, a battery backup system is coupled to the DC-link port 530 and a renewable energy source system is coupled to the bidirectional current source port 510. In this embodiment, the DAB converter is a dual full-bridge DC-DC converter 520 includes a high frequency transformer 540 and a leakage inductor 552. The DAB converter further includes controllable switching networks to modulate between the battery backup system coupled to the DC-link port 530 and the DC bus coupled to the DC bus port 560. As previously described, the renewable energy source system 510 may be photovoltaic system, a rectified wind turbine system, a fuel cell system or an ultracapacitor system. To enable modulation between the current source port 510 and the DC-link port 530, the boost converter 505 includes a DC inductor 512 and a first switching network 514, 516 and the DAB converter 520 includes a second switching network 534, 536, 537, 539 and a capacitive element 532 coupled to the DC-link port 530. A DC bus is coupled to the DC bus port 560 across a capacitive element 550 using a third switching network 542, 544, 546, 548 of the DAB converter 520. The modulation is controlled by a power flow controller coupled to the bidirectional current source port 510, the bidirectional DC-link port 530 and the bidirectional DC bus port 560 in order to implement the various modes, as previously described with reference to Table I.

Figure 5B:
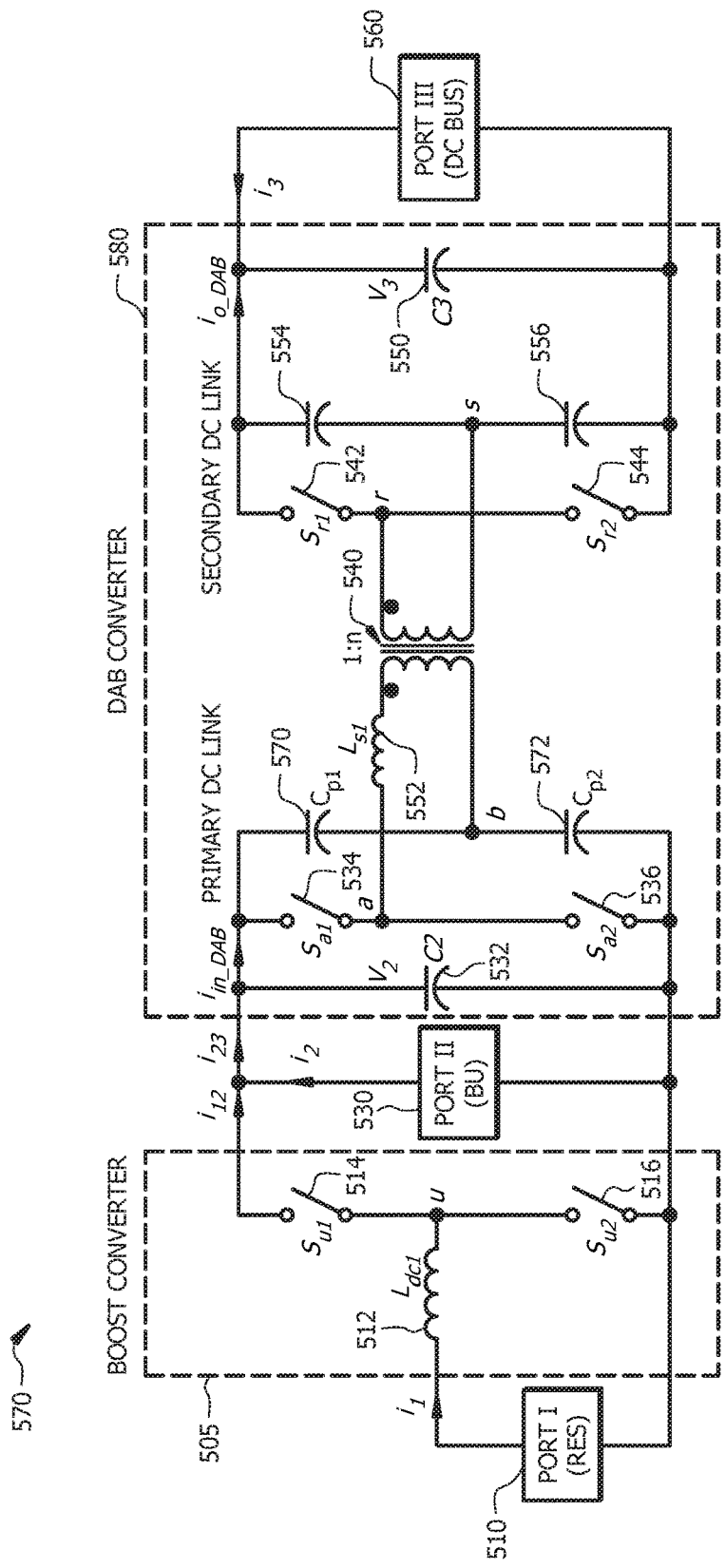
FIG. 5B illustrates an equivalent circuit of a three-port DC-DC converter, wherein the three-port DC-DC converter is a dual full-bridge DC-DC converter, in accordance with an embodiment of the present invention.

As shown in FIG. 5B, in an additional embodiment, integrated three-port bidirectional DC-DC converter 570 may include a dual half-bridge DC-DC converter 580 including having a phase-shift angle control. The system may further include, a bidirectional DC bus port 560 coupled to a high voltage side of the DAB converter 580, a bidirectional DC-link port 530 coupled to a low voltage side of the DAB converter 520, a bidirectional current source port 510 coupled to the low voltage side of the DAB converter 580 and a boost converter 505 having a duty cycle control, the boost converter 505 coupled between the bidirectional DC-link port 530 and the bidirectional current source port 510. In operation, a battery backup system is coupled to the DC-link port 530 and a renewable energy source system is coupled to the bidirectional current source port 510. In this embodiment, the DAB converter is a dual half-bridge DC-DC converter 580 which includes a high frequency transformer 540 and a leakage inductor 552. The DAB converter further includes controllable switching networks to modulate between the battery backup system coupled to the DC-link port 530 and the DC bus coupled to the DC bus port 560. As previously described, the renewable energy source system 510 may be photovoltaic system, a rectified wind turbine system, a fuel cell system or an ultracapacitor system. To enable modulation between the current source port 510 and the DC-link port 530, in this embodiment, the boost converter 505 includes a DC inductor 512 and a first switching network 514, 516 and the DAB converter 580 includes a second switching network 534, 536 and capacitive elements 532, 570, 572 coupled to the DC-link port 530. A DC bus is coupled to the DC bus port 560 across capacitive elements 550, 556, 556 using a third switching network 542, 544 of the DAB converter 580. The modulation is controlled by a power flow controller coupled to the bidirectional current source port 510, the bidirectional DC-link port 530 and the bidirectional DC bus port 560 in order to implement the various modes, as previously described with reference to Table I.

Figure 5C:
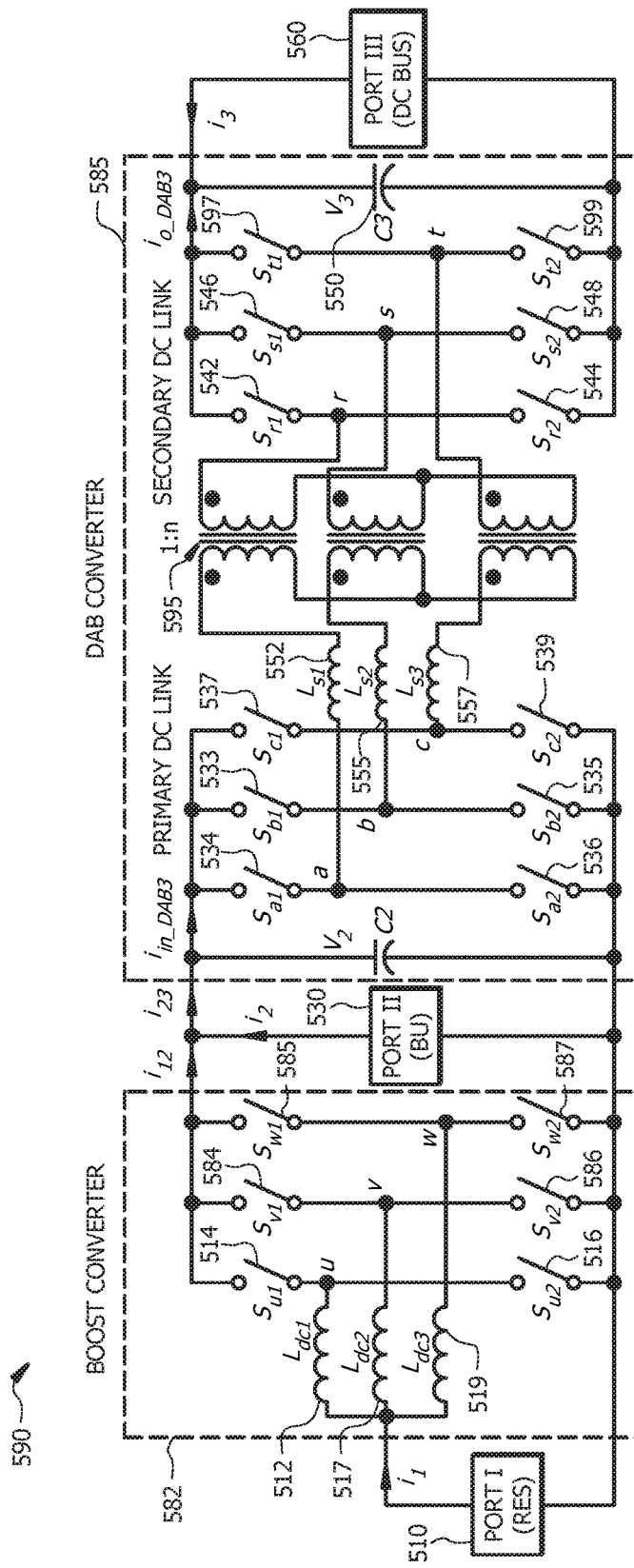
FIG. 5C illustrates an equivalent three-port DC-DC converter, wherein the three-port DC-DC converter is a dual three-phase DC-DC converter, in accordance with an embodiment of the present invention.

As shown in FIG. 5C, in an additional embodiment, integrated three-port bidirectional DC-DC converter 590 may include a dual three-phase DC-DC converter 585 including having a phase-shift angle control. The system may further include, a bidirectional DC bus port 560 coupled to a high voltage side of the DAB converter 585, a bidirectional DC-link port 530 coupled to a low voltage side of the DAB converter 585, a bidirectional current source port 510 coupled to the low voltage side of the DAB converter 585 and a boost converter 582 having a duty cycle control, the boost converter 582 coupled between the bidirectional DC-link port 530 and the bidirectional current source port 510. In operation, a battery backup system is coupled to the DC-link port 530 and a renewable energy source system is coupled to the bidirectional current source port 510. In this embodiment, the DAB converter is a dual three-phase DC-DC converter 585 which includes a high frequency transformer 595 comprising three windings and a leakage inductors 552, 555, 557. The DAB converter further includes controllable switching networks to modulate between the battery backup system coupled to the DC-link port 530 and the DC bus coupled to the DC bus port 560. As previously described, the renewable energy source system 510 may be photovoltaic system, a rectified wind turbine system, a fuel cell system or an ultracapacitor system. To enable modulation between the current source port 510 and the DC-link port 530, in this embodiment, the boost converter 582 includes three DC inductors 512, 517, 519 and a first switching network 514, 516, 584, 585, 586, 587 and the DAB converter 585 includes a second switching network 534, 536, 533, 535, 537, 539 and capacitive element 532 coupled to the DC-link port 530. A DC bus is coupled to the DC bus port 560 across capacitive element 550 using a third switching network 542, 544, 546, 548, 597, 599 of the DAB converter 585. The modulation is controlled by a power flow controller coupled to the bidirectional current source port 510, the bidirectional DC-link port 530 and the bidirectional DC bus port 560 in order to implement the various modes, as previously described with reference to Table I.

Figure 6:
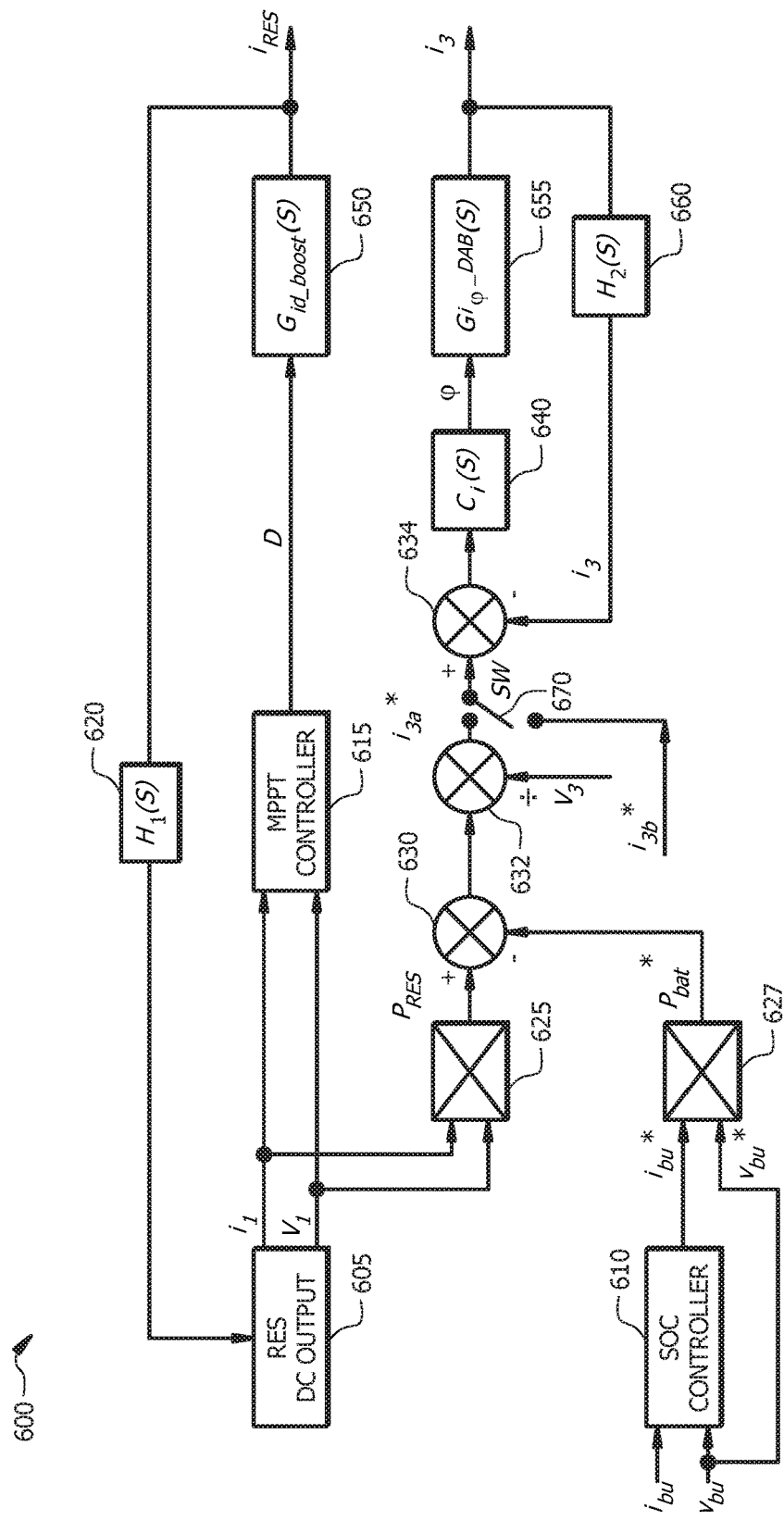
FIG. 6 illustrates a power flow control system diagram of a three-port DC-DC converter, in accordance with an embodiment of the present invention.

FIG. 6 illustrates the power flow controller 600 for the boost converter and the DAB converter of the grid-interactive system using a three port DC-DC converter. The output current of the DC-DC converter is controlled by the phase shift angle and the duty cycle is used to realize the MPPT. For the stand-alone mode, the phase shift angle is controlled by the voltage controller and the battery current is determined by the renewable energy source system power and the load requirement. When the renewable energy source system power is low, the backup battery system discharges and provides part of the power to the load. When the RES is high, the excess power will charge the battery. For the grid-connected system, the battery current is more flexible and is determined by the state of charge (SOC) management. If the battery is fully charged, the extra RES power will be send back to the grid.

In one embodiment, the power flow controller 600 includes an SOC controller 610 and an MPPT controller 615. The SOC controller receives the current and voltage from the battery backup system and calculates 627 the available power of the battery backup system. The MPPT controller 615 receives the current and voltage from the RES and calculates 625 the available power of the RES. The available battery backup power and the available RES power are processed through a series of calculation units 630, 632, 634, 680 to determine the operating mode of the three port bidirectional DC-DC converter. The MPPT can be realized by the MPPT controller 615 by controlling the duty cycle D. $G_{id\_boost}(s)$ 650 is the duty cycle to current transfer function of the boost converter. The resulting current of the renewable energy source is fed back to the renewable energy source DC output 605 through a first transfer function module 620. The output current $i_3$ on the high voltage side of the DAB converter is controlled by the current controller $C_i(s)$ 650 of DAB converter, and $G_{i\varphi\_DAB}(s)$ 655 is the phase-shift to current transfer function of DAB converter. The output current is fed back through a second transfer function module 660. The reference of $i_3$ is varied in different scenarios. When the battery state-of-charge controller is activated for battery power management, the reference is determined by the battery's reference current, i.e. $i_3^* = (P_{RES} - P_{bat}^*)/V_3$. Otherwise, the reference is $i_{3b}^*$ is given by the load requirement from high voltage DC bus.

According to the FIG. 4, the average state equation can be written as:

$$\begin{cases} C_2 \dfrac{dV_2}{dt} = i_{23} - i_{in\_DAB} \\ C_3 \dfrac{dV_3}{dt} = -\dfrac{V_3}{R} i_{o\_DAB} \end{cases} \quad (6)$$

Where $$i_{in\_DAB} = \frac{P_3}{V_2}, \quad i_{o\_DAB} = \frac{P_3}{V_3'}$$

The small signal model can be derived by expanding the average model into Taylor series around the operating point, and then neglecting the higher order nonlinear terms, which is described as follows:

$$\begin{cases} C_2 \dfrac{d\hat{v}_2}{dt} = -m_1\hat{\varphi} - g\hat{v}_o \\ C_3 \dfrac{d\hat{v}_3}{dt} = -\dfrac{\hat{v}_3}{R} + m_2\hat{\varphi} + g\hat{v}_d \end{cases} \quad (7)$$

For three-phase converter, $$m_1 = \frac{V_3'(4\pi - 6|\varphi|)}{6\pi\omega L_s}, \, m_2 = \frac{V_2(4\pi - 6|\varphi|)}{6\pi\omega L_s}, \, g = \frac{\varphi(4\pi - 3|\varphi|)}{6\pi\omega L_s},$$

For half-bridge and full-bridge, $$m_1 = \frac{V_3'(\pi - 2|\varphi|)}{4\pi\omega L_s}, \, m_2 = \frac{V_2(\pi - 2|\varphi|)}{4\pi\omega L_s}, \, g = \frac{\varphi(\pi - |\varphi|)}{4\pi\omega L_s},$$

The output current to control transfer function can be derived $$G_{i\varphi}(s) = \frac{1}{R} G_{v\varphi}(s) = \frac{sC_2 m_2 - gm_1}{s^2 C_2 C_3 + s\dfrac{C_2}{R} + g^2} \quad (8)$$

Figure 7:
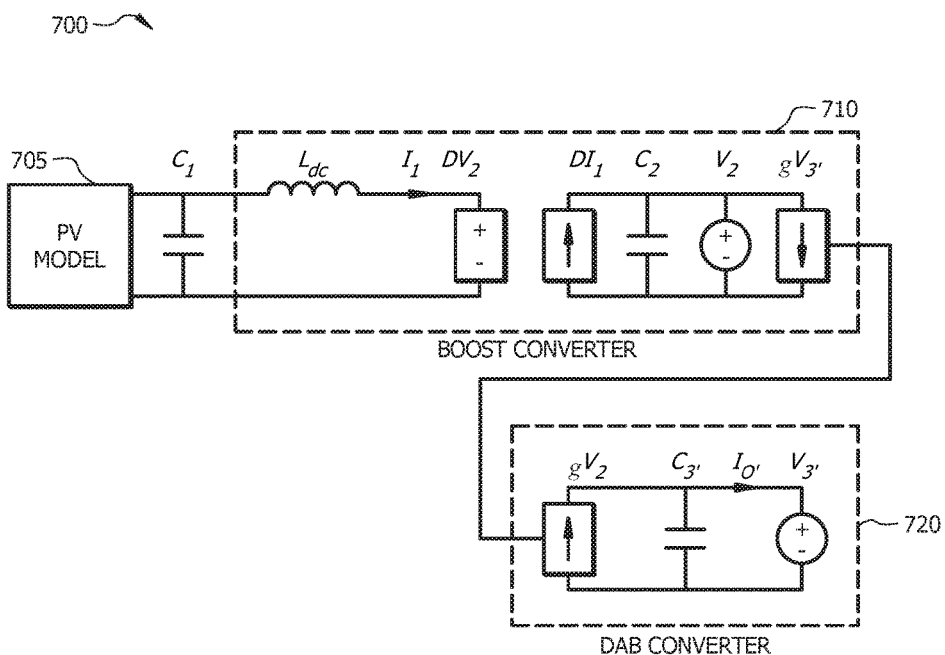
FIG. 7 illustrates an average model of a three-port DC-DC converter, in accordance with an embodiment of the present invention.

The average model of the three-port DC-DC converter is illustrated in FIG. 7. Based on the equivalent circuit, the converter 700 can be divided into two stages: boost converter stage 710 and DAB stage 720 coupled to the renewable energy source 705. According to (7), the average model can be derived as is illustrated with reference FIG. 7.

Figure 8:
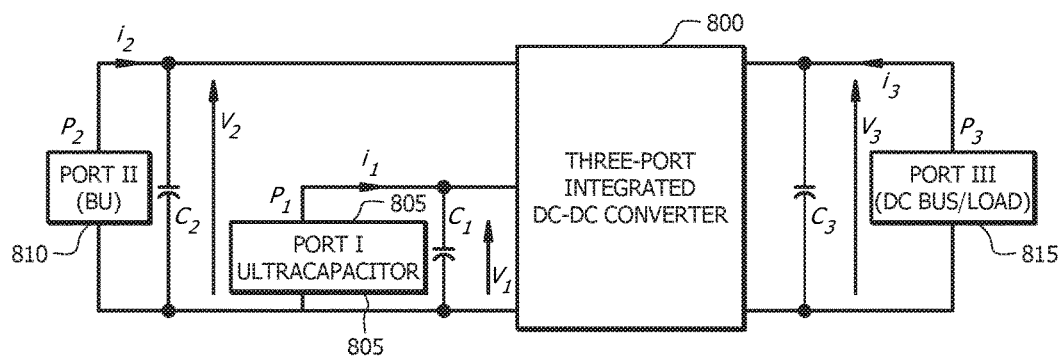
FIG. 8 illustrates an embodiment of the present invention, wherein an ultracapacitor is applied to the current source port of a three-port DC-DC converter, in accordance with an embodiment of the present invention.

In an additional embodiment, the invention can also be applied to an ultracapacitor with battery backup, as shown with reference to FIG. 8. In this embodiment of the integrated three-port DC-DC converter 800, a battery backup system 810 is coupled to the DC-link port, an ultracapacitor 805 is coupled to the current source port and a DC load is coupled to the DC bus port 815. The operation mode of the ultracapacitor will be the same of Table I, except that the non-existing mode for RES becomes available for the ultracapacitor. The control method will be similar except the MPPT function will be removed.

The advantages of the proposed converter of the present invention include, for all of the three types of DAB converter, the same power flow control method can be realized by the phase shift angle between the primary side devices and the secondary side devices. Additionally, the duty cycle can be used for RES power control, benefits from DC inductor current ripple are realized and ZVS can be guaranteed in different operating modes, even when RES voltage varies in a wide voltage range and battery voltage changes in small voltage range with different state of charge (SOC) and charge/discharge status. In addition, the power flow control of the proposed three-port converter can be decoupled in a wide operating range, as such the converter can effectively be treated as a boost-stage converter cascaded with a DAB-stage converter.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An integrated three-port bidirectional DC-DC converter comprising:
   a dual active bridge (DAB) converter having a phase-shift angle control;
   a bidirectional DC bus port coupled to a high voltage side of the DAB converter;
   a bidirectional DC-link port coupled to a low voltage side of the DAB converter;
   a bidirectional current source port coupled to the low voltage side of the DAB converter;
   a boost converter having a duty cycle control coupled between the bidirectional DC-link port and the bidirectional current source port; and
   a power flow controller coupled to the bidirectional current source port, the bidirectional DC-link port and the bidirectional DC bus port, wherein the power flow controller further comprises a state of charge (SOC) controller coupled to the bidirectional DC-link port of the DAB converter and a maximum port point tracking (MPPT) controller coupled to the bidirectional current source port of the DAB converter.

2. The integrated three-port bidirectional DC-DC converter of claim 1, further comprising a battery backup system coupled to the bidirectional DC-link port of DAB converter.

3. The integrated three-port bidirectional DC-DC converter of claim 1, further comprising a renewable energy source system coupled to the bidirectional current source port of DAB converter.

4. The integrated three-port bidirectional DC-DC converter of claim 3, wherein the renewable energy source system is selected from a photovoltaic system, a rectified wind turbine system, a fuel cell system and an ultracapacitor system.

5. The integrated three-port bidirectional DC-DC converter of claim 1, further comprising a DC distributed bus coupled to the bidirectional DC bus port of the DAB converter.

6. The integrated three-port bidirectional DC-DC converter of claim 1, wherein the boost converter further comprises a first switching network.

7. The integrated three-port bidirectional DC-DC converter of claim 1, wherein the boost converter further comprises a DC inductor.

8. The integrated three-port bidirectional DC-DC converter of claim 1, wherein the DAB converter further comprises a high frequency transformer.

9. The integrated three-port bidirectional DC-DC converter of claim 8, wherein the DAB converter further comprises a second switching network coupled between the bidirectional DC-link port and the high frequency transformer of the DAB converter.

10. The integrated three-port bidirectional DC-DC converter of claim 8, wherein the DAB converter further comprises a third switching network coupled between the bidirectional DC bus port and the high frequency transformer of the DAB converter.

11. The integrated three-port bidirectional DC-DC converter of claim 1, wherein the DAB converter is selected from a dual half-bridge converter, a dual full-bridge converter and a dual three-phase converter.

12. A DC distributed energy system comprising:
- an integrated three-port bidirectional DC-DC converter comprising;
  - a dual active bridge (DAB) converter having a phase-shift angle control;
  - a bidirectional DC bus port coupled to a high voltage side of the DAB converter;
  - a bidirectional DC-link port coupled to a low voltage side of the DAB converter;
  - a bidirectional current source port coupled to the low voltage side of the DAB converter;
  - a boost converter having a duty cycle control coupled between the bidirectional DC-link port and the bidirectional current source port;
  - a power flow controller coupled to the bidirectional current source port, the bidirectional DC-link port and the bidirectional DC bus port, wherein the power flow controller further comprises a state of charge (SOC) controller coupled to the bidirectional DC-link port of the DAB converter and a maximum port point tracking (MPPT) controller coupled to the bidirectional current source port of the DAB converter;
- a renewable energy source (RES) system coupled to the bidirectional current source port of the DAB converter; and
- a battery backup system coupled to the bidirectional DC-link port of the DAB converter.

13. The DC distributed energy system of claim 12, wherein the DAB converter is selected from a dual half-bridge converter, a dual full-bridge converter and a dual three-phase converter.

14. The DC distributed energy system of claim 12, wherein the renewable energy source system is selected from a photovoltaic system, a rectified wind turbine system, a fuel cell system and an ultracapacitor system.

15. A method of providing DC distributed energy, the method comprising:
- coupling a battery backup system to a low voltage side bidirectional DC-link port of an integrated three-port bidirectional DC-DC converter, wherein the DC-link port includes a boost converter having duty cycle control;
- coupling a renewable energy source system coupled to a low voltage side bidirectional current source port of the integrated three-port bidirectional DC-DC converter, wherein the current source port includes a dual active bridge (DAB) converter having a phase-shift angle control;
- coupling a DC distributed bus to a high voltage side bidirectional DC bus port of the high voltage side of the integrated three-port bidirectional DC-DC converter;
- coupling a power flow controller to the low voltage side bidirectional current source port, the low voltage side bidirectional DC-link port and the high voltage side bidirectional DC bus port, wherein the power flow controller further comprises a state of charge (SOC) controller coupled to the bidirectional DC-link port and a maximum port point tracking (MPPT) controller coupled to the bidirectional current source port; and
- controlling the battery backup system, the renewable energy source system and the DC distributed bus to provide DC distributed energy using the SOC controller and the MPPT controller.

16. The method of claim 15, wherein the integrated three-port bidirectional DC-DC converter is selected from a dual half-bridge converter, a dual full-bridge converter and a dual three-phase converter.

17. The method of claim 15, wherein the renewable energy source system is selected from a photovoltaic system, a rectified wind turbine system, a fuel cell system and an ultracapacitor system.

* * * * *